United States Patent [19]

Beale et al.

[11] Patent Number: 4,481,037

[45] Date of Patent: Nov. 6, 1984

[54] CEMENT COMPOSITIONS

[75] Inventors: James Beale, Lichfield; Robert F. Viles, Tamworth, both of England

[73] Assignee: Fosroc International Limited, Birmingham, England

[21] Appl. No.: 500,867

[22] Filed: Jun. 3, 1983

[30] Foreign Application Priority Data

Jun. 24, 1982 [GB] United Kingdom ............... 8218323

[51] Int. Cl.³ .................... C04B 7/32; C04B 11/12
[52] U.S. Cl. .................... 106/104; 106/109; 106/111
[58] Field of Search ............... 106/104, 109, 111

[56] References Cited

U.S. PATENT DOCUMENTS

| | | | |
|---|---|---|---|
| 3,024,123 | 3/1962 | Theilacker et al. | 106/109 |
| 3,775,143 | 11/1973 | Mikhailov et al. | 106/104 |
| 4,350,533 | 9/1982 | Galer et al. | 106/104 |

FOREIGN PATENT DOCUMENTS

| | | | |
|---|---|---|---|
| 1506417 | 4/1978 | United Kingdom | 106/90 |
| 2033367A | 5/1980 | United Kingdom | 106/90 |
| 1576943 | 10/1980 | United Kingdom | 106/90 |
| 2058037A | 4/1981 | United Kingdom | 106/90 |

*Primary Examiner*—James Poer
*Attorney, Agent, or Firm*—Cushman, Darby & Cushman

[57] ABSTRACT

A cement composition which when mixed with water hydrates to form a hardened cement containing ettringite comprises a high alumina cement, beta-anhydrite and calcium oxide and/or calcium hydroxide. The composition may also contain a calcium sulphate which is partially water soluble, an alkali metal sulphate, an accelerator for the high alumina cement such as lithium carbonate, and/or a bentonite clay. The composition is particularly suitable for filling cavities in mines.

18 Claims, No Drawings

CEMENT COMPOSITIONS

This invention relates to cement compositions, and particularly to cement compositions for use in the production of supportive concrete-like materials for filling cavities in an underground mine.

British Patent No. 1576943 describes a process of preparing a concrete-like material for filling cavities in underground mines comprising adding a first aqueous slurry containing a hydraulic cement to the cavity, and concurrently adding a second aqueous slurry containing an agent for accelerating hardening of the cement and leaving the slurries to harden into a supportive concrete-like material in the cavity. According to the patent ordinary Portland cement on its own does not set or harden rapidly enough to produce a supportive structure sufficiently soon, while so-called quick setting cements tend to begin setting too quickly to allow other constituents of the desired concrete-like material to be incorporated. For these reasons two slurries are used, one containing Portland cement and the other an accelerator for the hardening of the cement (preferably a mixture of triethanolamine, sodium carbonate and potassium carbonate), and bentonite which acts as a suspension agent for the accelerator. One or both slurries may contain an aggregate material such as run-of-mine coal or pit waste and when the two slurries are mixed together the bentonite acts as a suspension agent for the cement and any aggregate contained in the first slurry as well as for the components of the second slurry.

British patent applications Nos. 2033367A and 2058037A describe a quick setting cement composition based on a mixture of ordinary Portland cement, a calcium aluminate, calcium sulphate, a carboxylic acid or hydroxycarboxylic acid or a salt of such acids, for example sodium citrate, and an inorganic salt such as aluminium chloride, calcium chloride, magnesium bromide, potassium sulphate, sodium nitrate, potassium nitrate, calcium borate, sodium carbonate, potassium bicarbonate and sodium hydroxide, and 2058037A describes the use of such a composition for filling cavities according to the method of British Patent No. 1576943. The calcium aluminate may be for example $3CaO.Al_2O_3$, $12CaO.7Al_2O_3$, $CaO.Al_2O_3$; $CaO.2Al_2O_3$ or $CaO.3Al_2O_3$. $CaO.Al_2O_3$ is preferred because it is readily available as high alumina cement. The calcium sulphate may be an anhydrate, a hemihydrate or a dihydrate although anhydrous calcium sulphate is preferred.

An improved cement composition has now been found which is particularly suitable for use in the process described in British Patent No. 1576943 and which offers a number of advantages over the compositions hitherto used.

According to the invention there is provided a cement composition which comprises a high alumina cement as hereinafter defined, beta-anhydrite, and calcium oxide and/or calcium hydroxide, and which when mixed with water hydrates to form a hardened cement containing ettringite.

Ettringite is a calcium trisulphoaluminate having 32 molecules of water of crystallisation and has the formula $3CaO.Al_2O_3.3CaSO_4.32H_2O$. Ettringite is produced by the hydration of cementitious compositions containing calcium aluminate and calcium sulphate, and British Patent No. 1506417 describes the use of a composition containing Portland cement, aluminous cement and calcium sulphate. In the composition of British Patent No. 1506417 the aluminous cement is mainly $CaO.Al_2O_3$ and $CaO.2Al_2O_3$ together with at least 15% by weight $12CaO.7Al_2O_3$ and the calcium sulphate may be any of the available forms of calcium sulphate such as a dihydrate, a hemihydrate or an anhydrate.

The high alumina cement used in the cementitious composition of the invention may be any cement which falls within the definition of a high alumina cement according to B.S. 915 Part 2, i.e. a cement which contains not less than 32% by weight of alumina and has an alumina to calcium oxide ratio of between 0.85 and 1.3-1. Suitable cements include the LAFARGE FONDU cement described in British Patent No. 1506417 and a typical analysis of such a cement is, by weight, 39.0% alumina, 38.5% calcium oxide, 16.5% iron oxide ($Fe_2O_3$) and 4.0% silica.

It is essential that the composition contains calcium sulphate in the form of beta-anhydrite because other forms of calcium sulphate when used alone do not give satisfactory results. Hydrated forms such as plaster of Paris or gypsum both give strengths which are too low during the initial stages of the setting process and gamma-anhydrite hydrates very rapidly in water and gives similar results to the hydrated forms.

The composition will usually contain high alumina cement and beta-anhydrite in a ratio of from 3:7 to 4:1 by weight.

It is essential to include calcium oxide and/or calcium hydroxide to ensure that $3CaO.Al_2O_3$ is present in sufficient quantity to form ettringite during the hydration process.

In order to obtain sufficiently rapid and sufficiently high early strength development (a minimum of the order of 0.35 $MNm^{-2}$ after 2 hours is desirable) together with high ultimate strength development when the cement composition has fully hardened, care should be taken in selecting the quantity of calcium oxide or calcium hydroxide which is used. Too little results in inadequate strength development but it is also possible to add too much with the result that a gel which does not form a hardened cement is produced. The actual quantity used will be dependent on the quantity of each of the other constituents which is present but in general the best results are obtained when the quantity of calcium oxide and/or calcium hydroxide is from about 2.0 to about 8.5% by weight (preferably from about 3.5 to about 5.0% by weight) based on the weight of high alumina cement present in the composition.

In addition to the beta-anhydrite it may be desirable to include a proportion of a calcium sulphate, such as gypsum ($CaSO_4.2H_2O$), which is partially water soluble in order to increase the ultimate strength developed by the composition at the end of the hardening process. However care should be taken in selecting the quantity used because as has been stated earlier hydrated calcium sulphates have a detrimental effect on strength development in the early stages. The quantity of water soluble calcium sulphate should therefore be less than about 20% by weight based on the high alumina cement content of the composition and is preferably in the range about 5 to about 15% by weight. If desired alkali metal sulphates, such as potassium sulphate, can be used instead of or together with the gypsum for the same purpose. When potassium sulphate is used the amount should be less than about 15% by weight based on the high alumina cement content of the composition and is preferably in the range of about 2.5 to about 10.0% by weight.

According to a further feature of the invention there is provided a method of producing a hardened cement containing ettringite comprising forming a mixture of high alumina cement, beta-anhydrite, calcium oxide and/or calcium hydroxide and water and allowing the mixture to harden.

According to yet a further feature of the invention there is provided a method of producing a hardened cement containing ettringite comprising forming a first slurry by mixing together high alumina cement and water, forming a second slurry by mixing together beta-anhydrite, calcium oxide and/or calcium hydroxide and water, and optionally a partially water soluble calcium sulphate and/or an alkali metal sulphate, and/or an accelerator for the high alumina cement and/or a bentonite clay and mixing the two slurries together and allowing the resulting mixture to harden.

In carrying out the above method it is desirable to include a bentonite clay in the second slurry as a suspension agent, both for the components of the second slurry and for the whole composition when the two slurries are mixed together. Usually the quantity of bentonite used will be in the range of from 10.0 to 25.0% by weight based on the weight of beta-anhydrite present. It may also be desirable to include in the second slurry a proportion of a known accelerating agent for high alumina cements such as lithium carbonate in order to increase the rate of strength development during the early stages of the hardening process when the two slurries are mixed together. The quantity of lithium carbonate used will usually be up to 1.0% by weight and preferably 0.05-0.2% by weight based on the weight of high alumina cement content of the mixture when the two slurries are mixed together.

According therefore to a further feature of the invention there is provided an additive composition for admixture with high alumina cement and water to form a hardened cement containing ettringite comprising beta-anhydrite and calcium oxide and/or calcium hydroxide and optionally a partially water soluble calcium sulphate and/or an alkali metal sulphate and/or an accelerator for high alumina cement and/or a bentonite clay.

When used for filling cavities in mines according to the second method described above the compositions of the invention offer considerable advantages over the compositions which have previously been used and these are enumerated below:

(1) Appreciable cost savings are achieved both in terms of the actual raw materials used and in the amount of handling of materials which is needed. For equivalent strength of hardened cement the total quantity of solid starting materials can be reduced by approximately 20% and the total quantity of material which needs to be transported to the coal face where the cavity filling operation takes place can be reduced by more than 50%. These major advantages result from the use of high alumina cement instead of ordinary Portland cement or a mixture of ordinary Portland cement and high alumina cement.

(2) The two slurries are normally mixed together in the cavity which is to be filled inside a water-tight textile bag which acts as a support. Since the composition has a faster initial set than known compositions the bags are subjected to less hydro-static pressure and there is less danger of the bags bursting. It may also be possible to use a support made from less robust material.

(3) The composition can accommodate very high water contents (as high as 5:1 of water to solid constituents without free water separating out) so errors in the quantity of water added can be tolerated without preventing the composition hardening and with only a reduction in the ultimate strength achieved.

(4) The cement-containing slurry has a longer pumping life than similar slurries which contain both high alumina cement and ordinary Portland cement (of the order of 2 hours minimum compared with ½ hour).

(5) A composition containing only high alumina cement is less aggressive to the skin thus improving the working conditions for workers operating the process.

The following examples will serve to illustrate the invention:

EXAMPLE 1

A series of hardened cement compositions were produced using a first slurry containing a LAFARGE FONDU high alumina cement having a surface area of 298m$^2$/kg and a second slurry containing beta-anhydrite and calcium oxide and in some cases other additives as well, as indicated as A to M in the top half of Table 1.

In all cases the compositions were adjusted so as to contain 182 kg high alumina cement, 182 kg other solids and 910 kg water (91% by volume and 72% by weight) and to produce 1 cubic meter of the overall composition.

In all cases the beta-anhydrite used was a material ground to 98% by weight minus 100 mesh BSS and containing 1% by weight free lime as a grinding aid, and the bentonite was a natural calcium montmorillonite clay which had been activated by an addition of 3% sodium carbonate.

Slurry A was adjusted to a pH of 7.0 before use.

The compression strength of the compositions was measured at various time intervals from 1 hour to 7 days and the results obtained are recorded in the bottom half of Table 1.

The results contained in the column headed X which are included for comparison purposes were obtained using 450 kg of a mixture of high alumina cement, ordinary Portland cement, beta-anhydrite and citric acid, 50 kg of a mixture of sodium carbonate and bentonite and 860 kg water (86% by volume and 63% by weight) which quantities were sufficient to produce 1 cubic meter of cement.

TABLE 1

|  | A | B | C | D | E | F | G | H | I | J | K | L | M | X |
|---|---|---|---|---|---|---|---|---|---|---|---|---|---|---|
| Beta-CaSO$_4$ | 82.0 | 79.0 | 73.8 | 82.0 | 80.0 | 78.5 | 78.5 | 72.0 | 72.0 | 74.5 | 72.0 | 72.0 | 75.0 | |
| CaSO$_4$.2H$_2$O | — | — | — | — | — | — | — | 5.0 | 5.0 | — | — | — | — | |
| CaO | — | 5.0 | 11.0 | — | 2.0 | 5.0 | 5.0 | 5.0 | 5.0 | 5.0 | 5.0 | 2.5 | 5.0 | |
| Clay | 18.0 | 16.0 | 15.2 | 17.6 | 17.6 | 16.1 | 16.1 | 18.0 | 17.6 | 18.0 | 18.0 | 18.0 | 17.6 | |
| Li$_2$CO$_3$ | — | — | — | 0.4 | 0.4 | 0.4 | 0.4 | — | 0.4 | — | — | — | 0.4 | |
| K$_2$SO$_4$ | — | — | — | — | — | — | — | — | — | 2.5 | 5.0 | 7.5 | 5.0 | |
| STRENGTH/MNm$^{-2}$ | | | | | | | | | | | | | | |
| 1 hour | — | — | — | — | — | — | — | — | — | — | — | — | — | 0.35 |
| 2 hours | — | 0.40 | — | — | — | 0.94 | — | 0.62 | — | — | — | — | — | 0.43 |

TABLE 1-continued

|  | A | B | C | D | E | F | G | H | I | J | K | L | M | X |
|---|---|---|---|---|---|---|---|---|---|---|---|---|---|---|
| 4 hours | — | 1.13 | 0.00 | — | — | 1.50 | — | 0.91 | — | — | — | — | — | 0.64 |
| 1 day | 0.35 | — | — | 1.18 | 1.25 | 2.04 | — | 2.41 | — | — | — | — | — | 1.80 |
| 3 days | — | 2.58 | — | — | — | 3.40 | 4.23 | 3.64 | 4.60 | 4.55 | 3.64 | 0.78 | 3.43 | 2.89 |
| 5 days | — | 3.25 | — | — | — | 3.31 | — | 4.47 | — | — | — | — | — | 3.93 |
| 7 days | — | 4.29 | — | 2.03 | 2.08 | 3.48 | 4.89 | 4.65 | 5.10 | 5.02 | 5.10 | 1.30 | 4.62 | 4.55 |

The results obtained for A, D, E and L demonstrate the importance of calcium oxide being present in sufficient quantity. A and D contained no calcium oxide, E contained 2.0% and L contained 2.5% and all gave cement compositions which had severely reduced strength development compared with B which contained 5% calcium oxide. However as shown by composition C which contained 11% calcium oxide it is possible for too much calcium oxide to be present with the result that a gel which does not set is produced.

The results for compositions D to G show the effect of the addition of lithium carbonate on the properties of the basic composition. Lithium carbonate improved early strength development but the cement compositions containing lithium carbonate did not continue to increase in strength very greatly after about 3 days.

Composition G which had been allowed to stand for a week after conversion to slurry form before being mixed with the high alumina cement gave improved results compared with composition F possibly due to partial hydration of the beta-anhydrite and the results obtained using compositions H, I, J, K and M demonstrate that the presence of a soluble sulphate, either as calcium sulphate or as potassium sulphate, in the basic composition is beneficial and all gave better results than the prior art composition X.

EXAMPLE 2

A further series of cement compositions were produced as described in Example 1 and using a second slurry containing materials as indicated as 1 to 8 in the top part of Table 2 in order to demonstrate further the effect of varying different parameters of the composition of the invention on early strength development.

In each case the compression strength was measured after 2 hours and the results obtained are recorded in the bottom part of Table 2.

|  | 1 | 2 | 3 | 4 | 5 | 6 | 7 | 8 |
|---|---|---|---|---|---|---|---|---|
| Beta-$CaSO_4$ | 72.0 | 72.0 | 58.0 | 38.5 | 66.5 | 66.5 | — | 72.5 |
| $CaSO_4.2H_2O$ | 5.0 | 5.0 | 19.0 | 38.5 | 11.5 | — | 77.2 | 5.0 |
| CaO | 8.5 | 3.5 | 5.0 | 5.0 | 5.0 | 5.0 | 5.8 | — |
| $Ca(OH)_2$ | — | — | — | — | — | — | — | 5.0 |
| $K_2SO_4$ | — | — | — | — | — | 11.5 | — | — |
| Clay | 14.5 | 19.5 | 18.0 | 18.0 | 18.0 | 18.0 | 17.0 | 17.5 |
| Strength $MNm^{-2}$ after 2 hours | 0 | 0.37 | 0.24 | 0.14 | 0.5 | 0.16 | 0.04 | 0.41 |

Composition 1 contained too much calcium oxide, 3 and 4 contained too much water soluble calcium sulphate and 6 contained too much potassium sulphate for adequate early strength development. Composition 7 showed that at least some of the calcium sulphate must be present as beta-anhydrite. Compositions 2, 5 and 8 were satisfactory.

We claim:

1. A cement composition, substantially free from Portland cement, comprising high alumina cement, beta-anhydrite, in a ratio of from 3:7 to 4:1 by weight based on the weight of the high alumina cement and 2.0–8.5% by weight based on the weight of the high alumina cement of at least one form of lime selected from the group consisting of calcium oxide and calcium hydroxide, and which when mixed with water can accommodate high water contents up to 5:1 of water to solid constituents without free water separating out, and hydrates to form a hardened cement containing ettringite.

2. A cement composition according to claim 1 and which contains in addition a partially water soluble calcium sulphate.

3. A cement composition according to claim 1 and which contains in addition an alkali metal sulphate.

4. A cement composition according to claim 3 wherein the alkali metal sulphate is potassium sulphate.

5. A cement composition according to claim 1 and which contains in addition an accelerating agent for the high alumina cement.

6. A cement composition according to claim 5 wherein the accelerating agent is lithium carbonate.

7. A cement composition according to claim 1 and which contains in addition a bentonite clay.

8. A cement composition according to claim 1 wherein the lime content is 3.5–5.0% by weight based on the weight of high alumina cement.

9. A cement composition according to claim 2 wherein the quantity of partially water soluble calcium sulphate is less than 20% by weight based on the weight of high alumina cement.

10. A cement composition according to claim 9 wherein the quantity of partially water soluble calcium sulphate is 5.0–15.0% by weight based on the weight of high alumina cement.

11. A cement composition according to claim 3 wherein the quantity of alkali metal sulphate is less than 15% by weight based on the weight of high alumina cement.

12. A cement composition according to claim 11 wherein the quantity of alkali metal sulphate is 2.5–10.0% by weight based on the weight of high alumina cement.

13. A cement composition according to claim 6 wherein the quantity of lithium carbonate is up to 1.0% by weight based on the weight of high alumina cement.

14. A cement composition according to claim 13 wherein the quantity of lithium carbonate is 0.05–0.2% by weight based on the weight of high alumina cement.

15. A cement composition according to claim 7 wherein the quantity of bentonite clay is 10–25% by weight based on the weight of beta-anhydrite.

16. A method of producing a hardened cement containing ettringite comprising forming a mixture of the ingredients of a cement composition according to claim 1 and water and allowing the mixture to harden.

17. A method according to claim 16 comprising forming a first slurry by mixing together high alumina cement and water, forming a second slurry by mixing together beta-anhydrite, at least one form of lime selected from calcium oxide and calcium hydroxide and water and optionally at least one of a partially water soluble calcium sulphate, an alkali metal sulphate, an accelerator for the high alumina cement and a bentonite clay, mixing the two slurries together and allowing the resulting mixture to harden.

18. An additive composition for use in the method of claim 17 comprising beta-anhydrite and at least one form of lime selected from calcium oxide and calcium hydroxide and optionally at least one of a partially water soluble calcium sulphate, an alkali metal sulphate, an accelerator for high alumina cement and a bentonite clay.

* * * * *